United States Patent
Etzel et al.

(10) Patent No.: US 6,266,411 B1
(45) Date of Patent: Jul. 24, 2001

(54) METHOD AND APPARATUS FOR MULTIPLE-ITERATION CMEA ENCRYPTION AND DECRYPTION FOR IMPROVED SECURITY FOR WIRELESS TELEPHONE MESSAGES

(75) Inventors: Mark H. Etzel, Harvard, MA (US); Robert John Frank, Silver Spring, MD (US); Daniel Nelson Heer, Newton, NH (US); Robert Joseph McNelis, Columbia, MD (US); Semyon B. Mizikovsky, Morganville, NJ (US); Robert John Rance, Andover, MA (US); R. Dale Shipp, Columbia, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/059,107

(22) Filed: Apr. 13, 1998

Related U.S. Application Data (60) Provisional application No. 60/043,536, filed on Apr. 14, 1997.

(51) Int. Cl.[7] ..................................................... H04K 1/00
(52) U.S. Cl. ............................... 380/28; 380/37; 380/270; 380/247; 455/410; 455/411
(58) Field of Search ............................... 380/28, 270, 37, 380/247, 29; 455/410, 411

(56) References Cited

U.S. PATENT DOCUMENTS

| | | | |
|---|---|---|---|
| 5,003,597 | * 3/1991 | Merkle | 380/37 |
| 5,159,634 | * 10/1992 | Reeds, III | 380/42 |
| 5,438,622 | * 8/1995 | Normile et al. | 380/46 |
| 5,594,797 | * 1/1997 | Alanara et al. | 380/28 |
| 6,075,859 | * 6/2000 | Rose | 380/247 |

OTHER PUBLICATIONS

Schneier, Bruce, "Applied Cryptography: Protocols, Algorithms, and Source Code in C", 10/1995, pp. 183, 270–273, 294–295 and 357.*
TR45.3 Appendix A to IS–54 Rev. B Dual–Mode Cellular System. pp. 1–25. Feb. 1992.*
Counterpane Labs. "Flaw in Cell Phone Encryption Identified; Design Process Blamed". pp. 1–3. Mar. 1997.*
Wagner et al. "Cryptoanalysis of the Cellular Message Encryption Algorithm". pp. 1–12, Aug. 1997.*
Schneier, Bruce, Applied Cryptography: Protocols, Algorithms, and Source in C. Oct. 1995. pp. 316–318, 362–363, 366–367.*

* cited by examiner

*Primary Examiner*—Gail Hayes
*Assistant Examiner*—Ho S. Song

(57) ABSTRACT

An enhanced CMEA encryption system suitable for use in wireless telephony. A plaintext message is introduced into the system and subjected to a first iteration of a CMEA process, using a first CMEA key to produce an intermediate ciphertext. The intermediate ciphertext is then subjected to a second iteration of the CMEA process using a second CMEA key to produce a final ciphertext. Additional security is achieved by subjecting the plaintext and intermediate ciphertext to input and output transformations before and after each iteration of the CMEA process. The CMEA iterations may be performed using an improved use of a tbox function which adds permutations to a message or intermediate crypto-processed data. Decryption is achieved by subjecting a ciphertext message to the reverse order of the steps used for encryption, replacing the input and output transformations by inverse output and inverse input transformations, respectively, as appropriate.

14 Claims, 7 Drawing Sheets

METHOD AND APPARATUS FOR MULTIPLE-ITERATION CMEA ENCRYPTION AND DECRYPTION FOR IMPROVED SECURITY FOR WIRELESS TELEPHONE MESSAGES

This application claims the benefit of United States Provisional application serial No. 60/043,536 filed Apr. 14, 1997. The related application Ser. No. 09/059,110 entitled "Methods and Apparatus for Enhanced Security Expansion of a Secret Key into a Lookup Table for Improved Security for Wireless Telephone Messages" and filed on even date herewith is noted and incorporated by reference herein in its entirety.

FIELD OF THE INVENTION

The present invention relates generally to wireless telephone cryptography. More particularly, the invention relates to an improved security cryptosystem for rapid and secure encryption in a wireless telephone system.

BACKGROUND OF THE INVENTION

Wireless telephony uses messaging for several purposes including, for example, conveying status information, reconfiguring operating modes, handling call termination, and conveying system and user data such as a subscriber's electronic serial number and telephone number, as well as conversations and other data transmitted by the user. Unlike ordinary wire telephony, in which a central serving station is connected to each subscriber by wire, thus ensuring a fair degree of protection from eavesdropping and tampering by an unauthorized party (attacker), wireless telephone serving stations (i.e., base stations) must transmit and receive messages via signals over the air, regardless of the physical location of the subscribers.

Because the base station must be able to send and receive messages to and from a subscriber anywhere, the messaging process is wholly dependent on signals received from and sent to the subscriber equipment. Because the signals are transmitted over the air, they can be intercepted by an eavesdropper or interloper with the right equipment.

If a signal is transmitted by a wireless telephone in plaintext, a danger exists that an eavesdropper will intercept the signal and use it to impersonate a subscriber, or to intercept private data transmitted by the user. Such private data may include the content of conversations. Private data may also include non-voice data transmitted by the user such as, for example, computer data transmitted over a modem connected to the wireless telephone, and may also include bank account or other private user information transmitted typically by means of keypresses. An eavesdropper listening to a conversation or intercepting non-voice data may obtain private information from the user. The message content of an unencrypted telephone signal (i.e., plaintext signal) is relatively easily intercepted by a suitably adapted receiver.

Alternatively, an interloper can interject himself into an established connection by using a greater transmitting power, sending signals to the base station, and impersonating a party to the conversation.

In the absence of applying cryptography to messages being transmitted by wireless signals, unauthorized use of telephone resources, eavesdropping of messages, and impersonation of called or calling parties during a conversation are possible. Such unauthorized interloping and/or eavesdropping has in fact proven to be a grave problem and is highly undesirable.

The application of cryptography to wireless telephone applications offers a solution to the security problems discussed above, but the application of standard cryptography methods to wireless telephony has encountered significant difficulties due to the computationally-intensive nature of these methods. Specifically, these methods are subject to the constraints imposed by the desire to furnish a small wireless handset and the constraints on processing power imposed by the small size of the handset. The processing power present in typical wireless handsets is insufficient to handle the processing requirements of commonly known cryptographic algorithms such as DES (Data Encryption Standard). Implementing such a commonly known cryptographic algorithm in a typical wireless telephone system would potentially increase the time needed to process signals (i.e., encrypt and decrypt), thereby causing unacceptable delays for subscribers.

One cryptographic system for wireless telephony is disclosed in Reeds U.S. Pat. No. 5,159,634 ("Reeds"), incorporated herein by reference. Reeds describes a cryptographic system incorporated in a cryptographic algorithm known as the Cellular Message Encryption Algorithm (CMEA) process. There exists a desire to substantially improve this and other presently existing cryptographic systems for wireless telephony consistent with the resources available in this context.

SUMMARY OF THE INVENTION

The present invention advantageously addresses this and other desires. In one method according to the present invention, first and second CMEA keys are generated. Plaintext is introduced, and subjected to a first input transformation to produce a first input transformed message. The first input transformed message is processed by a first iteration of a CMEA process using the first CMEA key to produce a first intermediate ciphertext. This first intermediate ciphertext is subjected to a first output transformation to produce a first output transformed message. The first output transformed message is subjected to a second input transformation to produce a second input transformed message. The second input transformed message is processed by a second iteration of the CMEA process using the second CMEA key to produce a second intermediate ciphertext. The second intermediate ciphertext is subjected to a second output transformation to produce a second output transformed message. According to another aspect of the present invention, the first and second iterations of the CMEA process employ tbox functions with inputs permuted by secret offsets. According to another aspect of the present invention, the plaintext may be processed by first and second iterations of the CMEA process using first and second CMEA keys, without being subjected to input and output transformations. Encrypted text may be suitably decrypted according to the teachings of the present invention by introducing ciphertext and reversing in order and inverting the steps applied to encrypt plaintext.

An apparatus according to the present invention generates text and supplies it to an I/O interface which identifies it as generated text and supplies the text and the identification to an encryption/decryption processor, which in turn encrypts the text and supplies it to a transceiver for transmission. When the apparatus receives a transmission via the transceiver, the transmission is identified as incoming ciphertext, and the ciphertext and identification are supplied to the encryption/decryption processor which decrypts the ciphertext and supplies it as text to the I/O processor for routing to its destination. In a preferred embodiment, this apparatus is integrated into a wireless phone utilizing a standard microprocessor and memory consistent with those presently typically employed in such phones.

A more complete understanding of the present invention, as well as further features and advantages of the invention, will be apparent from the following Detailed Description and the accompanying drawings.

DETAILED DESCRIPTION

Figure 1:
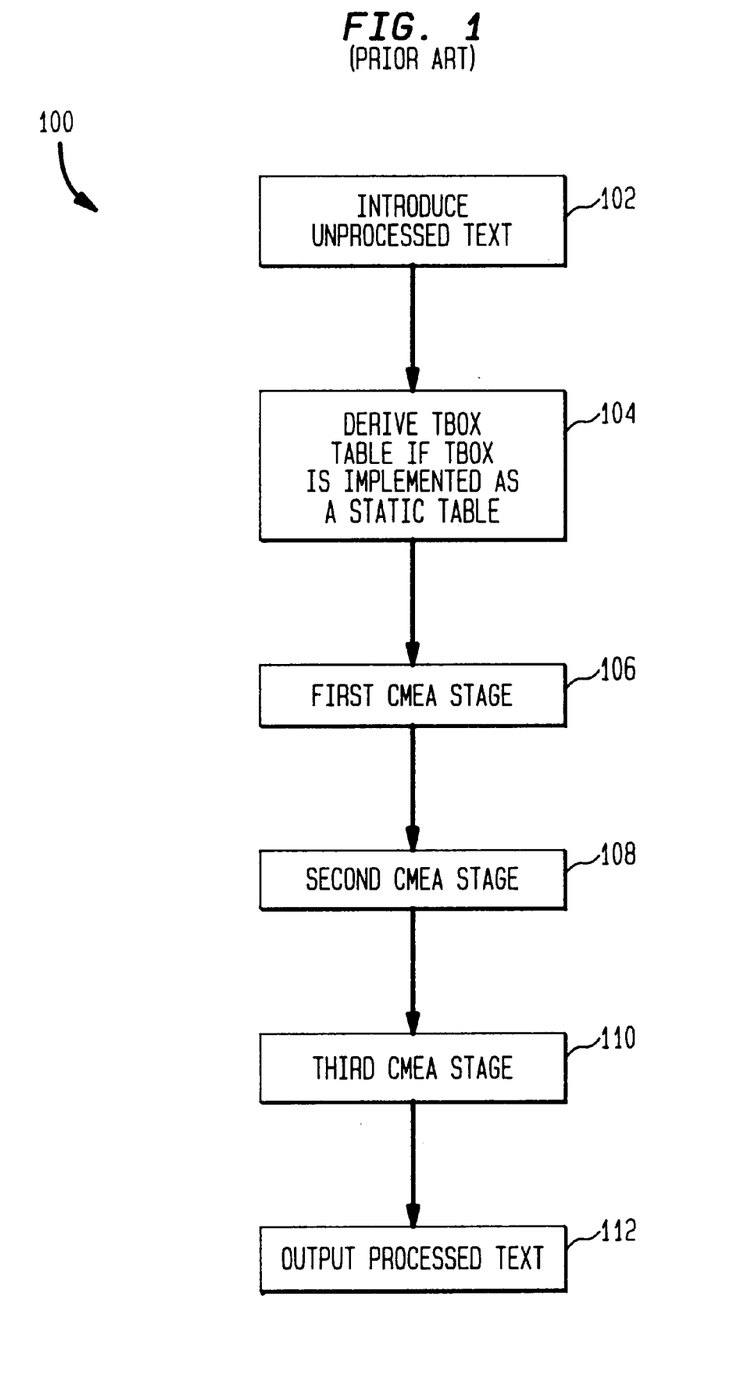
FIG. 1 is a flowchart illustrating a prior art CMEA key generation process and CMEA implementation.

FIG. 1 is a diagram illustrating a prior art method 100 using a CMEA key for encryption of certain critical user data which may be transmitted during a call. The creation and description of the CMEA key are well known in the art. The CMEA key is used to create a secret array, tbox(z), of 256 bytes. Alternatively, the tbox may be implemented as a function call. This implementation reduces the use of RAM, but increases processing time by roughly an order of magnitude.

At step 102, unprocessed text is introduced. At step 104, in systems which implement tbox as a static table rather than a function call, the static tbox table is derived. The tbox table is derived as follows. For each z in the range $0 \leq z < 256$, tbox(z)=C(((C(((C(((z XOR k0)+k1)+z)XOR k2)+k3)+z)XOR k4)+k5)+z)XOR k6)+k7)+z, where "+" denotes modulo 256 addition, "XOR" is the bitwise boolean XOR operator, "z" is the function argument, k0, . . . , k7 comprise the eight octets of the CMEA key, and C( ) is the outcome of a CAVE 8-bit table look-up.

CMEA comprises three successive stages, each of which alters each byte string in the data buffer. At steps 106, 108 and 110, first, second and third stages of the CMEA process are respectively performed, as will be described herein. A data buffer d bytes long, with each byte designated by b(i), for an integer in the range $0 \leq i < d$, is enciphered in three stages. The first stage (I) of CMEA is as follows:

1. Initialize a variable z to zero,
2. For successive integer values of i in the range $0 \leq i < d$
   a. form a variable q by: q=z (+) low order byte of i, where (+) is the bitwise boolean Exclusive-OR operator,
   b. form variable k by: k=TBOX(q),
   c. update b(i) with: b(i)=b(i)+k mod 256, and
   d. update z with: z=b(i)+z mod 256.

The second stage (II) of CMEA is:
1. for all values of i in the range $0 \leq i < (d-1)/2$: b(i)=b(i) $\oplus$(b(d-1-i) OR 1), where OR is the bitwise boolean OR operator.

The final or third stage (III) of CMEA is the decryption that is inverse of the first stage:
1. Initialize a variable z to zero,
2. For successive integer values of i in the range $0 \leq i < d$
   a. form a variable q by: q=z$\oplus$ low order byte of i,
   b. form variable k by: k=TBOX(q),
   c. update z with: z=b(i)+z mod 256,
   d. update b(i) with b(i)=b(i)-k mod 256.

At step 112, the final processed output is provided.

The CMEA process is self-inverting. That is, the same steps applied in the same order are used both to encrypt plaintext and to decrypt ciphertext. Therefore, there is no need to determine whether encryption or decryption is being carried out. Unfortunately, it has been shown that the CMEA process is subject to an attack which will allow recovery of the CMEA key used for a call.

In order to provide added security to customer information, an encryption system according to the present invention preferably performs two iterations of the CMEA process, with a different key used in each iteration. A first input transformation and a first output transformation are performed before and after the first iteration of the CMEA process, and a second input transformation and a second output transformation are performed after the second iteration of the CMEA process. An alternative encryption system according to the present invention preferably improves the use of the tbox function by adding at least one permutation of the tbox inputs in one or more iterations of the CMEA process. The improved use of the tbox function is disclosed in our patent application Ser. No. 09/059,116, entitled "Methods and Apparatus for Enhanced Security Expansion of a Secret Key into a Lookup Table for Improved Security for Wireless Telephone Messages" filed on even date with the present application and incorporated herein by reference. In another aspect of the invention, first and second iterations of the CMEA process may be performed, but without the input and output transformations before and after each iteration of the CMEA process.

Figure 2:
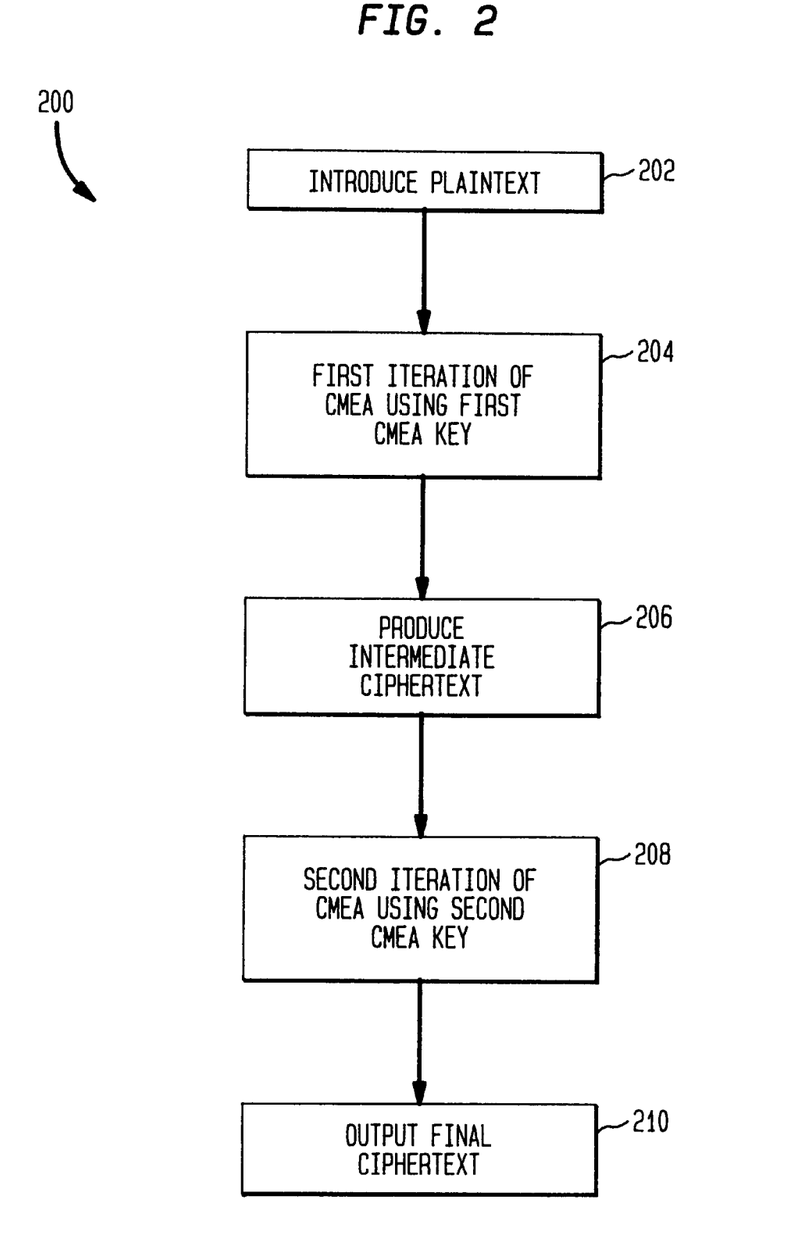
FIG. 2 is a flowchart illustrating an enhanced CMEA encryption method employing multiple CMEA iterations according to the present invention.

FIG. 2 is a flowchart showing the steps performed by an encryption process 200 according to an aspect of the present invention. The encryption process of FIG. 2 includes two iterations of the CMEA process described in connection with the discussion of FIG. 1, with a different CMEA key used for each iteration. At step 202, the plaintext is introduced into the encryption process. At step 204, the plaintext is encrypted in a first iteration using the CMEA process, using a first CMEA key. At step 206, the first iteration is completed, and intermediate ciphertext is produced. At step 208, the intermediate ciphertext is subjected to a second iteration of the CMEA process, using a second CMEA key. At step 210, the final ciphertext is produced.

Figure 3:
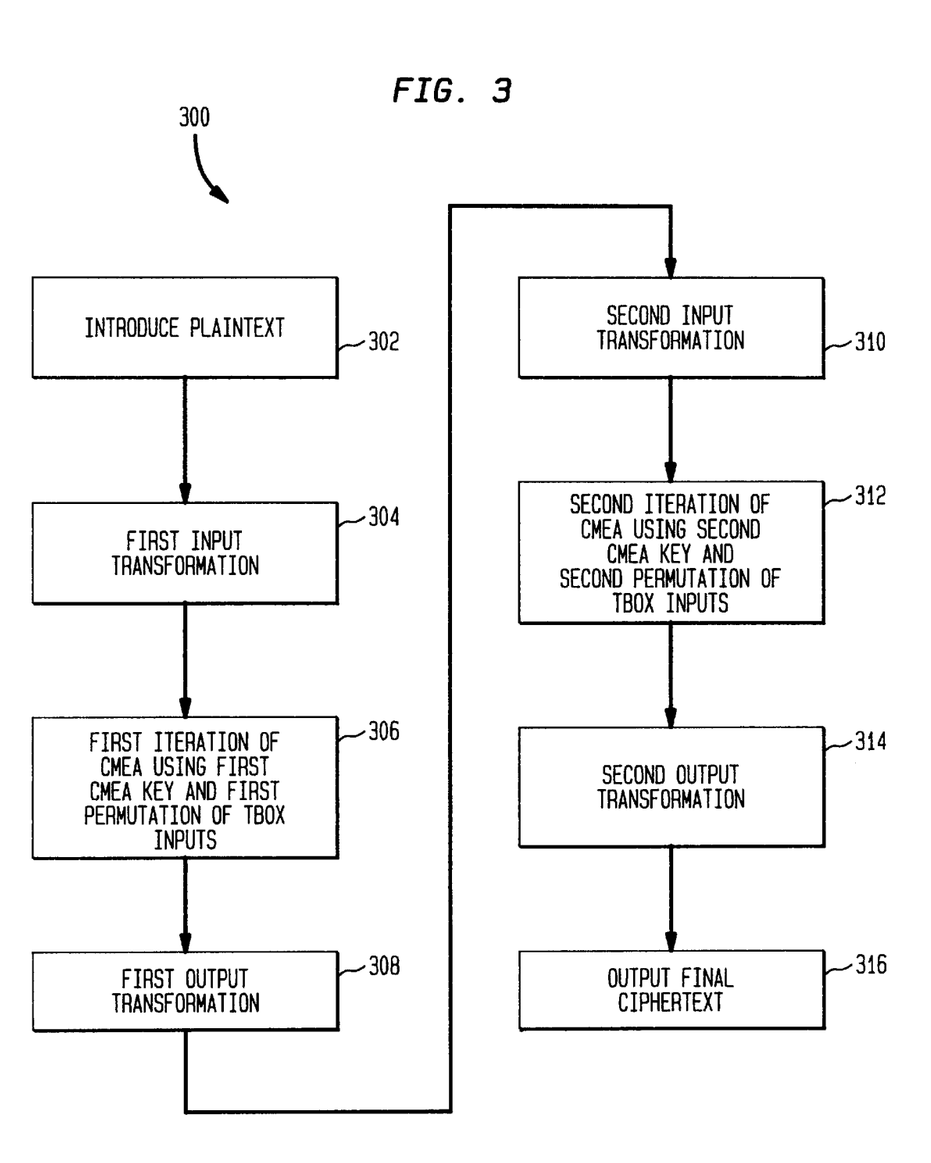
FIG. 3 is a flowchart illustrating an enhanced CMEA encryption method according to the present invention employing multiple CMEA iterations, each iteration being preceded by an input transformation and followed by an output transformation.

FIG. 3 is a diagram illustrating an encryption process 300 according to another aspect of the present invention. At step 302, the plaintext message is introduced into the encryption process. At step 304, the plaintext message is subjected to a first input transformation to produce a first input transformed message. At step 306, the first input transformed message is subjected to a first iteration of a CMEA process using a first CMEA key to produce a first intermediate ciphertext. Preferably the first iteration of the CMEA process employs an improved use of the tbox function in which each input of the tbox function is subjected to a permutation. The improved use of the tbox function is disclosed in our aforementioned application Ser. No. 09/059,116. At step 308, the output of the first iteration of the CMEA process is subjected to a first output transformation to produce a first output transformed message. At step 310, the first intermediate ciphertext is subjected to a second input transformation to produce a second input transformed message. At step 312, the transformed intermediate ciphertext is subjected to a second iteration of the CMEA process, using a second CMEA key to produce a second intermediate ciphertext. The second iteration of the CMEA process preferably employs the improved use of the tbox function described in our above mentioned application. At step 314, the second intermediate ciphertext is subject to a second output transformation to produce a second output transformed message. At step 316, second output transformed message is output as final ciphertext.

Figure 4:
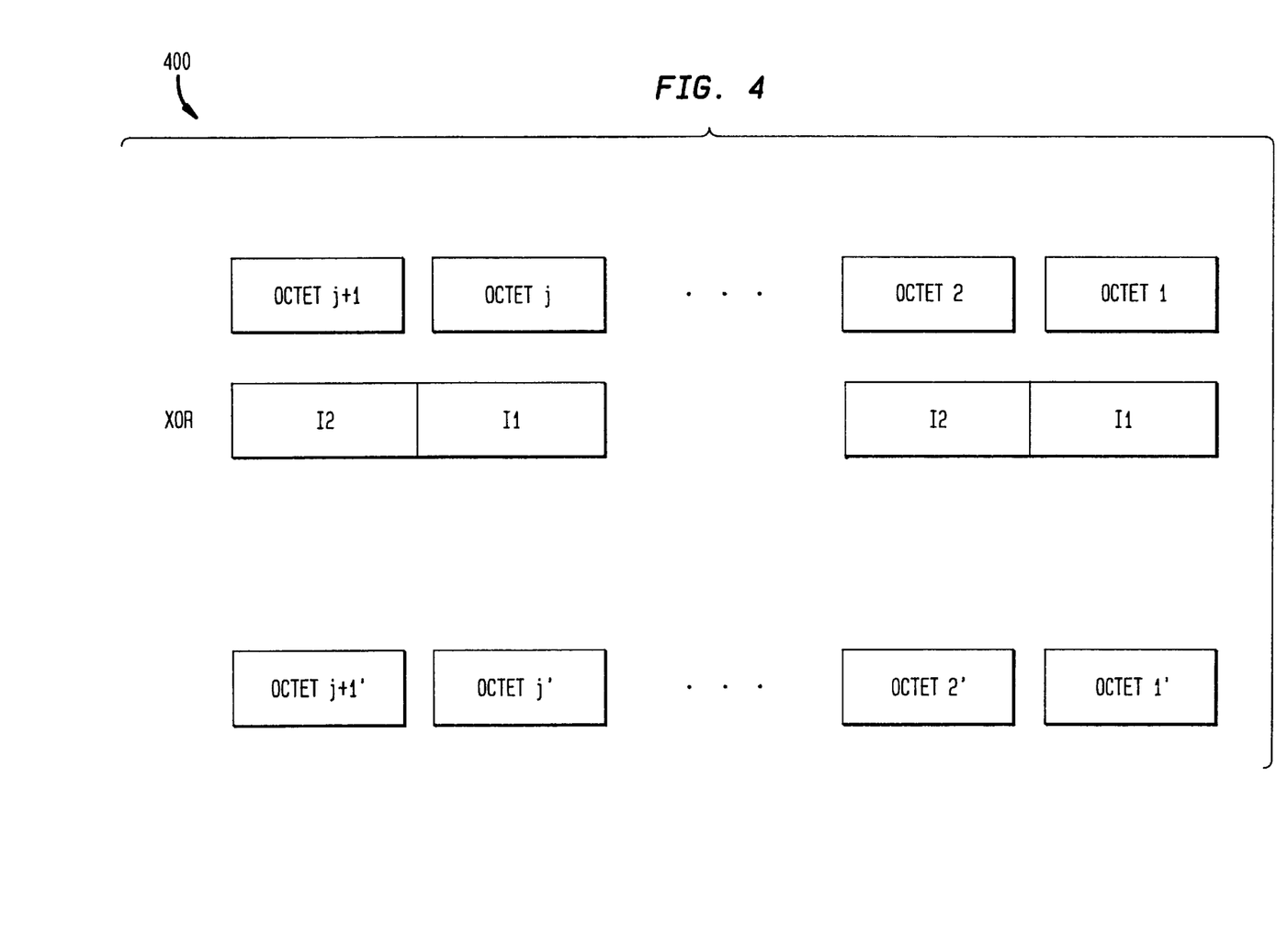
FIG. 4 is a detailed illustration of an input transformation suitable for use in an encryption method according to the present invention.

FIG. 4 is a diagram illustrating in detail an input transformation 400 which may suitably be used in the encryption process 300 described in connection with FIG. 3. The inverse input transformation 400 is self-inverting. Each of j+1 input data octets, j+1, j, . . . , 2, 1 is XORed with a transformation octet. The transformation octet is a secret value which may be created using any of a number of techniques commonly used in the art. Two transformation octets are preferably used and applied in alternating fashion to the input data octets. Transformation octet $I_2$ is applied to input data octet j+1, transformation octet $I_1$ is applied to input data octet j, transformation octet $I_2$ is applied to input data octet j−1, and so on. The application of the transformation produces a new set of input data octets j+1', j', . . . , 2', 1', which is then used as described above in connection with the discussion of FIG. 3.

Figure 5:
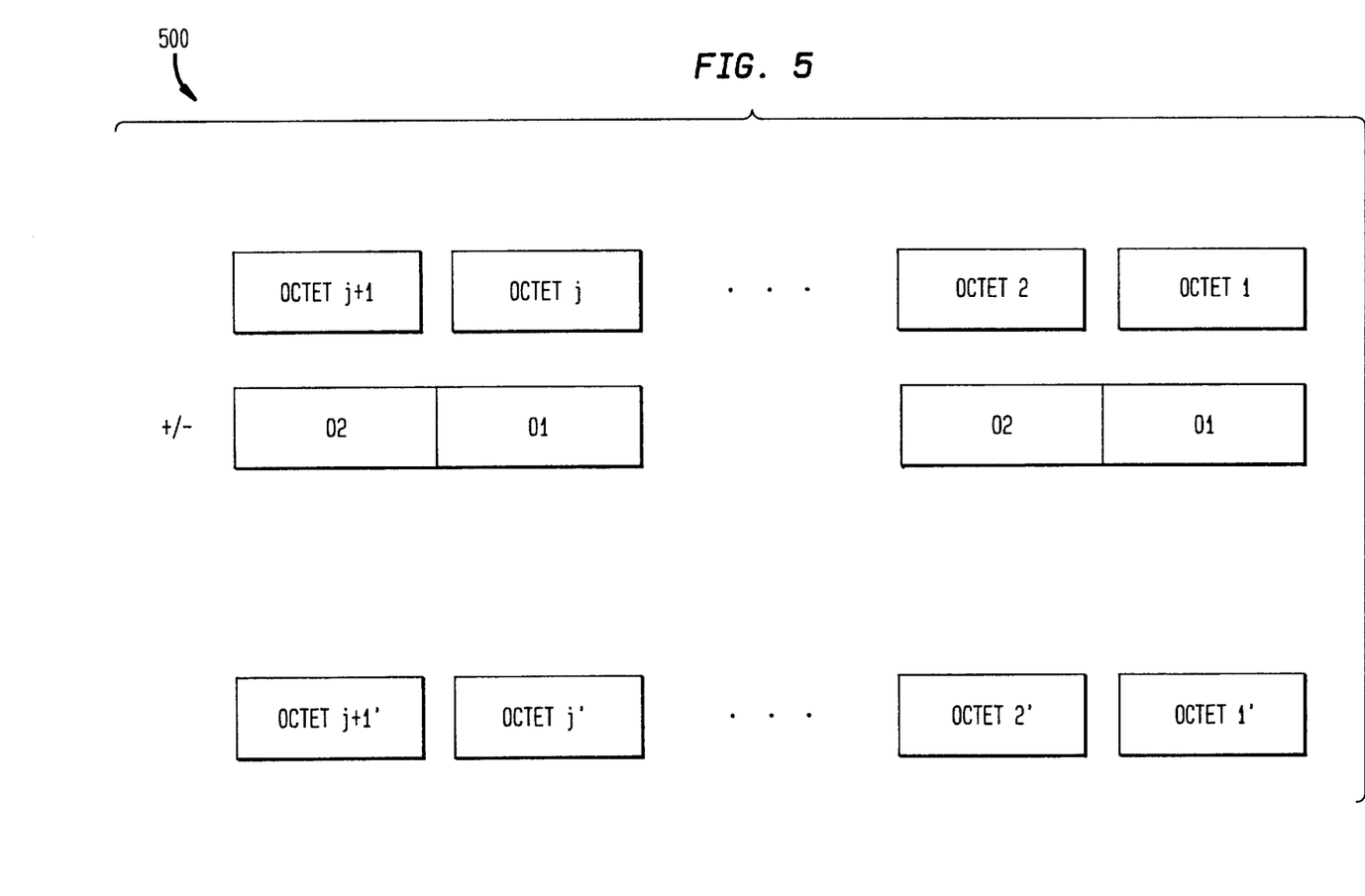
FIG. 5 is a detailed illustration of an output transformation suitable for use in an encryption method according to the present invention.

FIG. 5 is a diagram illustrating a forward/inverse output transformation 500 which may suitably be used in the encryption process 300 described in connection with FIG. 3. For the forward output transformation, each of j+1 output data octets, j+1, j, . . . , 2, 1 is summed with a transformation octet. The transformation octet is a secret value which may be created using any of a number of techniques commonly used in the art. For the inverse output transformation, the summation is replaced with a subtraction. Two transformation octets are preferably used and applied in alternating fashion to the output data octets. Transformation octet $O_2$ is applied to output data octet j+1, transformation octet $O_1$ is applied to output data octet j, transformation octet $O_2$ is applied to output data octet j−1, and so on. The application of the transformation produces a new set of output data octets j+1', j', . . . , 2', 1', which is then used as described above in connection with the discussion of FIG. 3.

Because the encryption system of the present invention requires the application of two keys, it is not self-inverting. That is, the same operations applied in the same order will not either encrypt plaintext or decrypt ciphertext. Moreover, the output transformation described in connection with the discussion of FIG. 5 is not self-inverting. Therefore, a separate decryption process is necessary, as described below.

Figure 6:
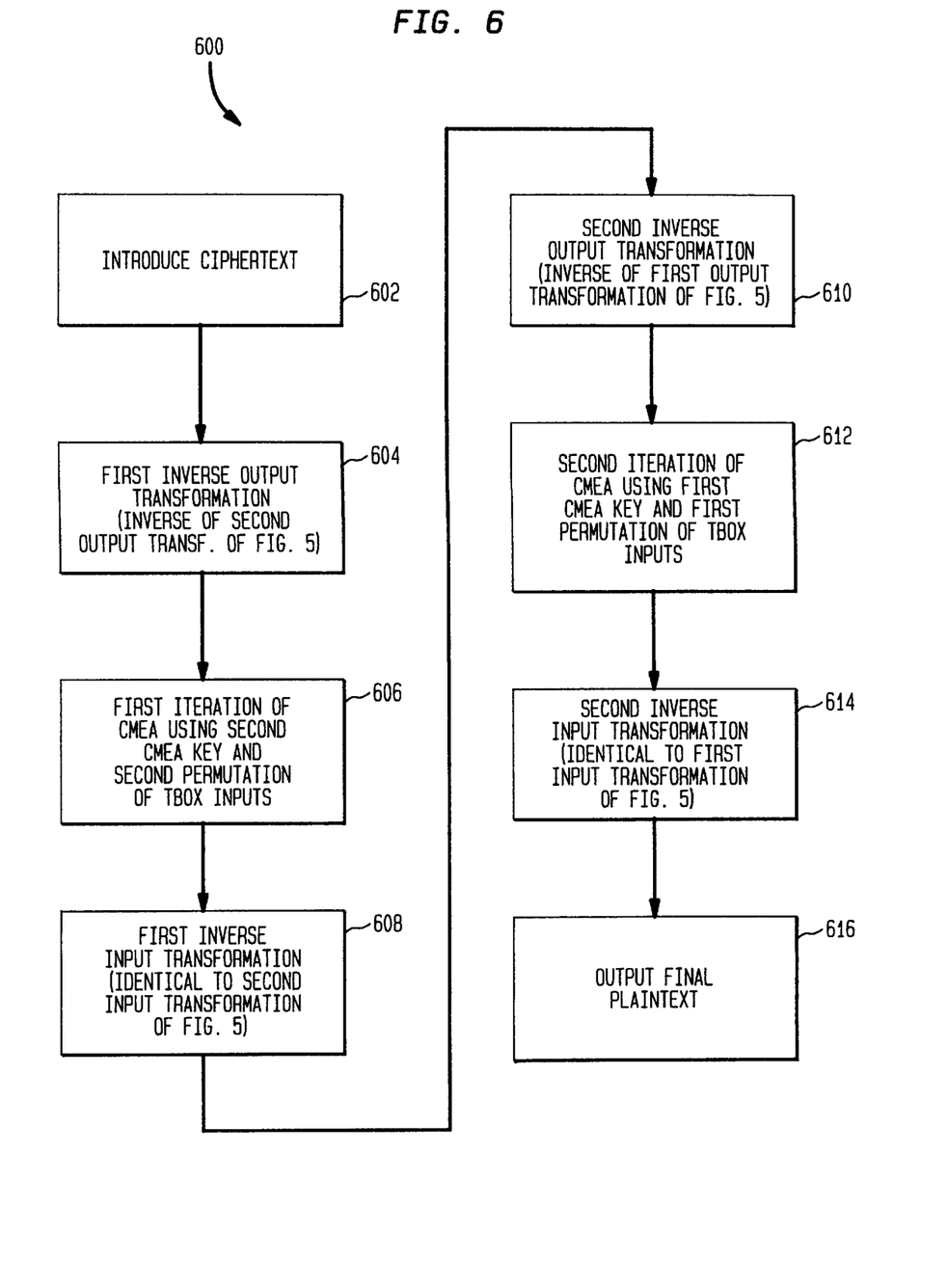
FIG. 6 is a flowchart illustrating a method according to the present invention of decrypting ciphertext encrypted by an enhanced CMEA process.

FIG. 6 illustrates a decryption process 600 according to an aspect of the present invention. Essentially, the steps illustrated in FIG. 3 are followed, but in the reverse of the order shown in FIG. 3. First and second inverse input and output transformations are employed in place of the input and output transformations of FIG. 3. The first inverse input transformation is simply the second input transformation described above in connection with the discussion of FIG. 3, and the second inverse input transformation is the first input transformation described above in connection with the discussion of FIG. 3.

At step 602, the ciphertext message is introduced into the decryption process. At step 604, the ciphertext message is subjected to a first inverse output transformation to produce a first inverse output transformed message. The first inverse output transformation is the inverse of the second output transformation described in connection with FIG. 3 and in more detail in connection with FIG. 5. In particular, the addition step in the output transformation is canceled by a subtraction in the inverse output transformation. At step 606, the first inverse output transformed message is subjected to a first iteration of the CMEA process to produce a first intermediate decrypted ciphertext message. The first iteration of the CMEA process preferably employs an improved use of the tbox function according to our aforementioned application Ser. No. 09/059,116. The keying used for this first iteration is the second CMEA key and the second tbox input permutation. At step 608, the first intermediate ciphertext is subjected to a first inverse input transformation, which is identical to the second input transformation described in connection with the discussion of FIG. 3, to produce a first inverse input transformed message. Next, at step 610, the first inverse input transformed message is subjected to a second inverse output transformation, which is the inverse of the first output transformation described in connection with the discussion of FIG. 3, to produce a second inverse output transformed message. At step 612, the second inverse output transformed message is subjected to a second iteration of the CMEA process to produce a second intermediate decrypted ciphertext message. The second iteration of the CMEA process preferably employs the improved use of the tbox function. The keying used for this iteration of the modified CMEA process is the first CMEA key and the first tbox input permutation. At step 616, the second intermediate decrypted ciphertext message is subjected to a second inverse input transformation, which is identical to the first input transformation described in connection with the discussion of FIG. 4 to produce a second inverse input transformed message. At step 618, the second iteration is completed and the second inverse input transformed message is output as the final plaintext.

The encryption described in connection with the discussion of FIG. 2 can be similarly reversed. In order to decrypt a message encrypted according to the aspect of the invention described in connection with FIG. 2 above, the decryption described at FIG. 6 is executed, but without executing the inverse input and output transformations.

Because the decryption described in connection with FIG. 6 cannot be accomplished simply by operating the encryption described in connection with FIG. 3, it is necessary for a device using encryption and decryption systems according to the present invention to recognize when a message needs to be encrypted and when it needs to be decrypted.

Figure 7:
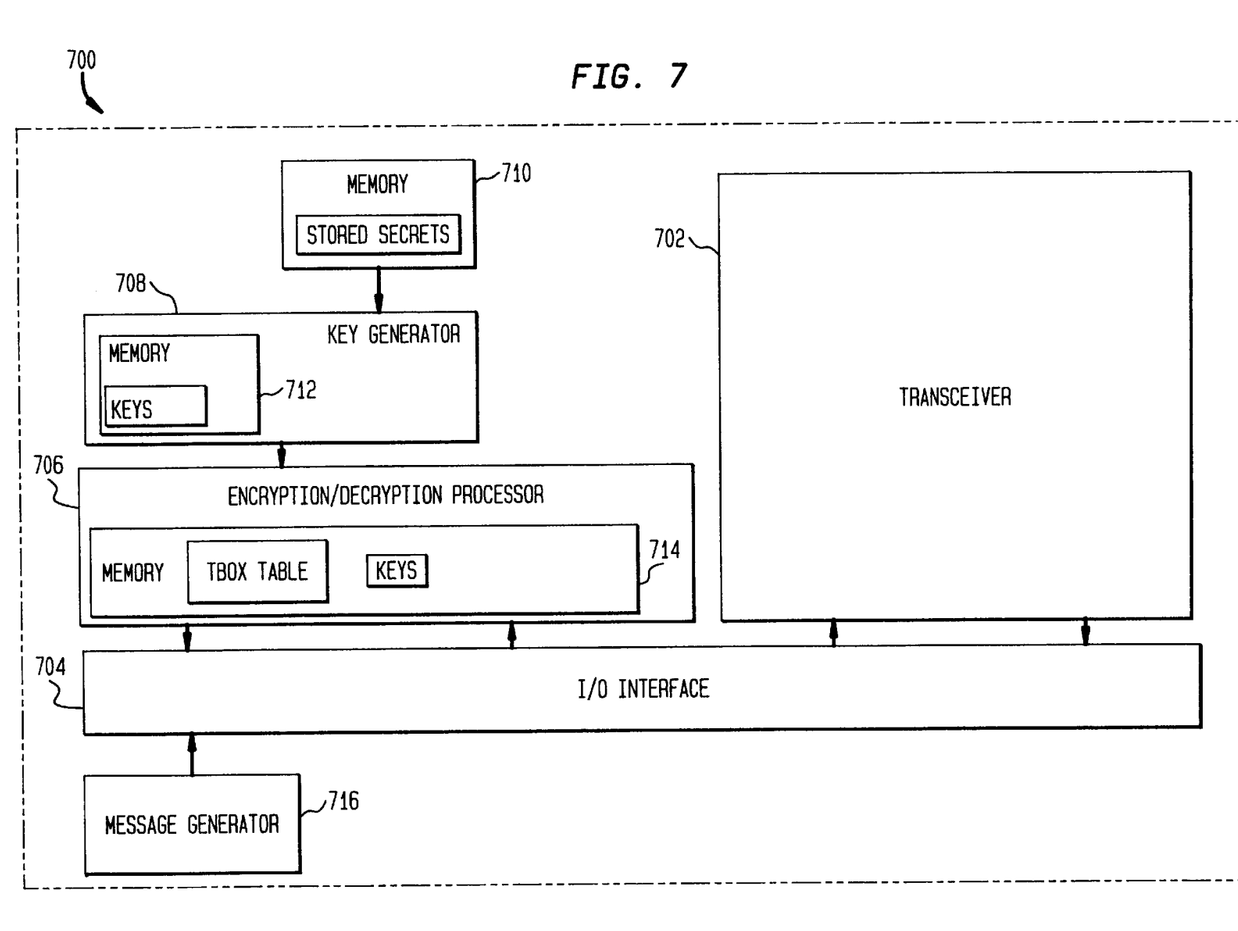
FIG. 7 is a diagram illustrating a telephone set employing enhanced CMEA encryption according to the present invention.

FIG. 7 is a diagram showing a wireless telephone set 700 equipped to perform message transmission and encryption/decryption according to the present invention, with facilities both for recognizing whether a message needs to be encrypted or decrypted, and for performing the appropriate encryption or decryption. The telephone set 700 includes a transceiver 702, an input/output (I/O) interface 704, an encryption/decryption processor 706, and a key generator 708. The key generator 708 receives and employs stored secret data for key generation. Stored secret data is preferably stored in nonvolatile memory 710 such as an EEPROM or a Flash memory. The key generator 708 stores the generated keys in memory 712. The encryption/decryption processor also includes memory 714 for storage of keys received from the key generator 708, a static tbox table which may be generated and used if it is desired to implement the tbox function as a static table, and other values which may be produced and stored during encryption and decryption. The telephone set 700 also includes a message generator 716, which generates messages to be encrypted by the encryption/decryption processor 706 and transmitted by the transceiver 702.

When an internally generated message is to be encrypted and transmitted by the telephone set 700, the message is transmitted from message generator 716 to the I/O interface 704. The I/O interface 704 identifies the message as an internally generated message to be encrypted and transmits the message, along with the identification, to the encryption/decryption processor 706. The encryption/decryption processor 706 receives one or more keys from the key generator 708, which it then uses to encrypt the message. Preferably, the encryption decryption processor 706 receives two keys from the key generator 708, which are then employed to perform two-iteration CMEA encryption using input and output transformations as described above in connection with FIG. 3.

The encryption/decryption processor 706 subjects the plaintext message to a first input transformation to produce a first input transformed message. Next, the first input transformed message is subjected to a first iteration of a CMEA process using a first CMEA key, to produce a first intermediate ciphertext message. The first iteration of the CMEA process may suitably employ the improved use of the tbox function in which each tbox function input is subjected to a permutation. The first intermediate ciphertext message is subjected to a first output transformation to produce a first output transformed message. Next, the first output transformed message is subjected to a second input transformation to produce a second input transformed message. The second input transformed message is then subjected to a second iteration of the modified CMEA process, using a second CMEA key, to produce a second intermediate ciphertext message. The second iteration process may also suitably employ the improved use of the tbox function. The output of the second iteration of the CMEA process is then subjected to a second output transformation to produce a second output transformed message. Finally, the second iteration is completed and the second output transformed message is produced as the final ciphertext. Upon completion of the encryption, the final ciphertext may be stored in memory 714, and is routed to the I/O interface 704 and to the transceiver 702 for transmission. When an encrypted message is received by the telephone set 700, the transceiver 702 passes it to the I/O interface 704. The I/O interface identifies the message as an encrypted message, and passes this identification, along with the message, to the encryption/decryption processor 706. The encryption/decryption processor 706 receives one or more keys from the key generator 708 and decrypts the message, preferably using a two-iteration CMEA decryption process as described in connection with FIG. 6.

When the encryption/decryption processor 706 receives a ciphertext message from the I/O interface 704, the ciphertext message is subjected to a first inverse output transformation to produce a first inverse output transformed message. The first inverse output transformation is the inverse of the second output transformation described in connection with FIG. 3 and in more detail in connection with FIG. 5. In particular, the addition step in the output transformation is canceled by a subtraction in the inverse output transformation. Next, a first iteration of the CMEA process is performed, preferably employing the improved use of the tbox function to produce a first intermediate decrypted ciphertext message. The keying used for this first iteration is the second CMEA key and the second tbox input permutation. Next, the first intermediate decrypted ciphertext message is subjected to a first inverse input transformation to produce a first inverse input transformed message. The first inverse input transformation is identical to the second input transformation described in connection with the discussion of FIG. 3. The second inverse input transformed message is then subjected to a second inverse output transformation to produce a second inverse output transformed message. The second inverse output transformation is the inverse of the first output transformation described in connection with the discussion of FIG. 3. A second iteration of the CMEA process is then performed, preferably employing the improved use of the tbox function, to produce a second intermediate decrypted ciphertext message. The keying used for this iteration of the modified CMEA process is the first CMEA key and the first tbox permutation. The second intermediate decrypted ciphertext message is then subjected to second inverse input transformation to produce a second inverse input transformed message. The second inverse input transformation is identical to the first input transformation described in connection with the discussion of FIG. 3. The second inverse input transformed message is passed as plaintext to the I/O interface 704, where it is then routed for its ultimate use.

The above-described enhancements to the CMEA process, while substantially increasing security, do not substantially increase processing or system resources, and are therefore well suited to use in an environment such as a wireless telephone system, in which units such as the moile units often have limited processing power.

While the present invention is disclosed in the context of a presently preferred embodiment, it will be recognized that a wide variety of implementations may be employed by persons of ordinary skill in the art consistent with the above discussion and the claims which follow below.

We claim:

1. A method of data encryption comprising the steps of:
   introducing a plaintext message;
   performing a first input transformation on the plaintext message to produce a first input transformed message;
   performing a first iteration of a CMEA process on the first input transformed message, using a first CMEA key, to produce a first intermediate ciphertext message; and
   performing a first output transformation on the first intermediate ciphertext message to produce a first output transformed message, the first output transformation being different than the first input transformation, being different than an inverse of the first input transformation and being non-self-inverting.

2. The method of claim 1 and also including the steps of:
   performing a second input transformation on the first output transformed message to produce a second input transformed message;
   performing a second iteration of the CMEA process on the second input transformed message, using a second CMEA key, to produce a second intermediate ciphertext message; and
   performing a second output transformation on the second intermediate ciphertext message to produce a second output transformed message.

3. The method of claim 2 wherein the first input transformed message is subjected to a tbox function including permutation of each input to a tbox function by first and second secret offsets during the first iteration of the CMEA process and the second input transformed message is subjected to a tbox function including permutation of each input to the tbox function by third and fourth secret offsets during the second iteration of the CMEA process.

4. A method of decryption of a ciphertext message, comprising the steps of:

introducing a ciphertext message;

performing a first inverse output transformation on the ciphertext message to produce a first inverse output transformed message;

performing a first iteration of a CMEA process on the first inverse output transformed message, using a second CMEA key, to produce a first intermediate decrypted ciphertext message; and performing a first inverse input transformation on the first intermediate decrypted ciphertext message to produce a first inverse input transformed message, the first inverse output transformation being different than the first inverse input transformation, being different than an inverse of the first inverse input transformation and being non-self-inverting.

5. The method of claim 4 and also including the steps of:

performing a second inverse output transformation on the first inverse input transformed message to produce a second inverse output transformed message;

performing a second iteration of the CMEA process on the second inverse output transformed message, using a first CMEA key, to produce a second intermediate decrypted ciphertext message; and performing a second inverse input transformation on the second intermediate decrypted ciphertext message to produce a second inverse input transformed message.

6. The method of claim 5 and also including the steps of retrieving first, second, third and fourth offsets created during encryption of a plaintext message to produce the ciphertext message, and subjecting the first inverse output transformed message to a tbox function including permutation of each tbox function input by the third and fourth offsets during the first iteration of the CMEA process and subjecting the second inverse output transformed message to a tbox function including permutation of each tbox function input by the first and second offsets during the second iteration of the CMEA process.

7. A wireless telephone, comprising:

a message generator receiving user inputs and formatting the user inputs into an outgoing message;

a memory storing secret data;

a key generator generating at least a first encryption key based on the secret data;

a processor processing the outgoing message by performing, a first input transformation on the outgoing message, a first CMEA process on output of the first input transformation, using the first encryption key, to produce a first ciphertext message, and a first output transformation on the first ciphertext message, the first output transformation being different than the first input transformation, being different than an inverse of the first input transformation and being non-self-inverting; and a transmitter transmitting the processed outgoing messages output from the processor.

8. The telephone of claim 7, wherein the processor further processes the outgoing message by performing, a second input transformation on output of the first output transformation, a second CMEA process on output of the second input transformation, using a second encryption key generated by the key generator, to produce a second ciphertext message, and a second output transformation on the second ciphertext message, the second output transformation being different than the second input transformation, being different than an inverse of the second input transformation and being non-self-inverting.

9. The telephone of claim 8, wherein the output of the first input transformation is subjected to a tbox function including permutation of each tbox function input by a first and a second offset during the first CMEA process and the output of the second input transformation is subjected to a tbox function including permutation of each tbox function input by a third and a fourth offset during the second CMEA process.

10. The telephone of claim 8, further comprising:

a receiver receiving incoming messages; and wherein the processor processes each incoming message by performing, a first inverse output transformation on the incoming message, the first inverse output transformation being an inverse of the second output transformation, a third CMEA process on output of the first inverse output transformation using the second encryption key, a first inverse input transformation on output of the third CMEA process, the first inverse input transformation being an inverse of the second input transformation, a second inverse output transformation on output of the first inverse input transformation message, the second inverse output transformation being an inverse of the first output transformation, a fourth CMEA process on output of the first inverse output transformation using the first encryption key, and a second inverse input transformation on output of the fourth CMEA process, the second inverse input transformation being an inverse of the first input transformation.

11. The telephone of claim 7, further comprising:

a receiver receiving an incoming message; and wherein the processor processes the incoming message by performing, an inverse output transformation on the incoming message, a CMEA process on output of the inverse output transformation using the first encryption key, and an inverse input transformation on output of the CMEA process.

12. The telephone of claim 11, further comprising:

an interface routing incoming messages from the receiver to the processor, routing outgoing messages from the message generator to the processor, and routing processed outgoing messages from the processor to the transmitter, the interface supplying the incoming message to the processor with a first identification signal identifying the incoming message as an incoming message and supplying the outgoing messages to the processor with a second identification signal identifying the outgoing message as an outgoing message.

13. The telephone of claim 11, wherein the transmitter and the receiver are embodied in a transceiver.

14. A wireless telephone, comprising:

a receiver receiving an incoming message;

a memory storing secret data;

a key generator generating at least a first encryption key based on the secret data;

a processor processing the incoming message by performing, an inverse output transformation on the incoming message, a CMEA process on output of the inverse output transformation using the first encryption key, and an inverse input transformation on output of the CMEA process, the inverse output transformation being different than the inverse input transformation, being different than an inverse of the inverse input transformation and being non-self-inverting.

* * * * *